E. N. BACHELDER.
COFFEE URN.
APPLICATION FILED JUNE 15, 1917.
1,259,471.
Patented Mar. 19, 1918.
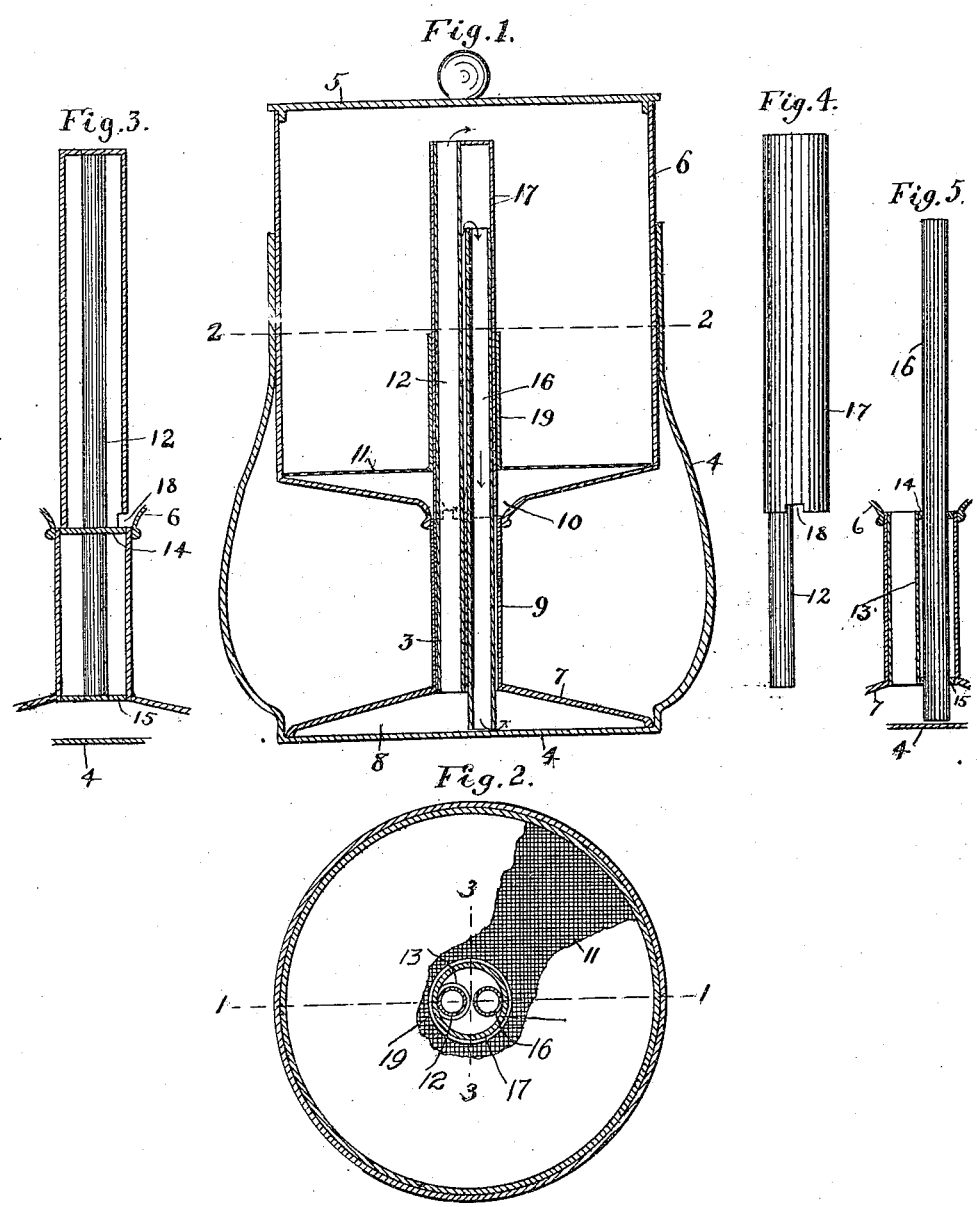
Inventor:
Elmer N. Bachelder.
by S. W. Bates
Atty.

UNITED STATES PATENT OFFICE.

ELMER N. BACHELDER, OF PORTLAND, MAINE.

COFFEE-URN.

1,259,471.     Specification of Letters Patent.     Patented Mar. 19, 1918.

Application filed June 15, 1917. Serial No. 174,868.

*To all whom it may concern:*

Be it known that I, ELMER N. BACHELDER, a citizen of the United States, residing at Portland, in the county of Cumberland and State of Maine, have invented certain new and useful Improvements in Coffee-Urns, of which the following is a specification.

My invention relates to coffee urns for preparing infusions of coffee and it relates particularly to a coffee urn constructed on the same principles of that described in my Letters Patent No. 951,626 dated Mar. 8, 1910, but with a construction more applicable to cheap and rapid manufacture, more simple to make, easier to care for and keep clean and in other respects an improvement as an article to be put upon the market and sold for household use.

According to my original construction, an infusion tank was located in the upper portion of the urn and this was kept supplied with boiling water by means of a centrally located boiling tube communicating with the usual boiling chamber at the bottom. A siphon was arranged to siphon the contents of the infusion chamber back into the lower portion of the urn to be mixed with the clear water when the boiling process stopped. This siphon tube was located away from the boiling tube and the center of the tank and was composed of a relatively small tube which was liable to get filled up, was difficult and expensive to manufacture, and was difficult to keep clean and keep in repair after it was built.

According to my present invention, I locate both the boiling tube and the siphon tube at the center of the urn and closely adjacent to each other, the upper end of the siphon tube being covered by an inverted extension tube which forms around the siphon tube, the upper or short leg of the siphon, the extension tube being relatively large in diameter and being so constructed that it will readily slip off from the upper end of the siphon tube proper, thereby avoiding danger of clogging and insuring the economical construction of the various parts.

My invention may best be understood by reference to the accompanying drawing in which—

Figure 1 is a section taken on the line 1—1 of Fig. 2.

Fig. 2 is a section taken on the line 2—2 of Fig. 1.

Fig. 3 is a section taken on the line 3—3 of Fig. 2.

Fig. 4 is a detail of the extension tube with the boiling tube attached.

Fig. 5 is a section through the supporting column taken on the line 1—1 of Fig. 2 with certain parts omitted.

The urn is made up of the main tank or open-topped vessel 4 having a suitable cover 5 which fits both the urn proper and the infusion tank. It will in ordinary cases have a suitable handle and spout.

The infusion tank 6 fits in the open top of the tank 4 and it is supported by a disk 7 which rests on the bottom of the tank 4. The disk 7 is hollowed out on its under side so that it forms with the bottom of the tank a boiling chamber.

A hollow supporting column 9 connects the disk and the infusion tank, these three parts being connected solidly together so that they may be all removed and put back as a whole.

At the lower portion of the infusion tank where it connects with the supporting column, there is formed a sump 10 where the infusion is drawn off from the infusion tank to the main tank 4.

Preferably the bottom of the infusion tank is formed a slight cone shape and the sump is protected by a pervious diaphragm 11 through which the infusion must pass before it can be discharged into the lower tank 4.

The boiling tube 12 extends from the upper portion of the boiling chamber to a point near the top of the infusion tank passing through the hollow column 9 which is provided as here shown with a sleeve 13 (shown clearly in Fig. 5) which fits closely about the boiling tube. The two ends of the hollow column 9 are provided with tight diaphragms 14 and 15 so that the interior of the tube is not exposed to contact with the infusion.

The principal or long leg of the return siphon tube 16 extends from the lower portion of the boiling chamber upward through the hollow supporting column 9 making, as here shown, a permanent joint with both the diaphragms 14 and 15 and terminates a short distance below the upper end of the boiling tube 12.

The upper end of the siphon tube 16 is covered by an extension tube 17 which forms the upper or short leg of the siphon which comes into operation when the contents of the infusion tank 6 is to be siphoned down after the infusion is made. This extension or auxiliary tube 17 serves the purpose of a guard or holder for the boiling tube and opens out through its upper end which is provided with a diaphragm pierced by the boiling tube only. The boiling tube is preferably soldered in position in the extension tube and forms with it a separate part as shown in Fig. 4 when it is necessary to take the apparatus apart. The lower end of the extension tube terminates in the sump 10 and is provided with one or more notches 18 through which the infusion passes during the siphon action of the device.

It will be seen that outside of the main urn or tank 6 and the cover there are practically but two pieces namely the boiling tube and the extension tube which are secured together as one piece and the disk infusion tank supporting column and siphon tube. A sleeve 19 fits loosely around the extension tube 17 and is secured to the pervious diaphragm 11 which may be thus slipped out and inserted readily.

The operation of the device is the same as in my original Patent No. 951,626. The infusion tank with its connecting parts is placed in the open mouth of the urn after the necessary amount of water has been provided. The coffee is placed in the infusion tank and the urn is set boiling.

The boiling water passes upward through the boiling tube over-flowing from the upper end of the extension tube and mingling with the coffee. A further supply of hot water will pass upward through the siphon tube 16 but not so freely as through the regular boiling tube. This water will pass out through the notches 18 into the sump 10.

At the same time these two currents of hot water are passing upward the infusion chamber is surrounded by steam and the temperature in the upper chamber is thus kept just below the boiling point, that is about 210½ degrees F. After the water has been boiling from 6 to 10 minutes according to the strength required, the heat is removed or the boiling stopped when the steam in the steam chamber will condense and start the siphon action of the siphon tube, the strong infusion being drawn down and mingled with the water in the lower tank.

The parts are all readily made with tubing or by the spinning process and the whole apparatus is well designed for a commercial article adapted to be put on the market.

I claim:—

1. In a coffee urn, the combination of a main open-topped vessel, an infusion tank at the upper portion of the said vessel, a disk resting normally on the floor of said main vessel and adapted to form with said floor a boiling chamber, a hollow supporting column connecting said disk with said tank, an auxiliary tube extending from the top of said hollow column to the upper portion of said tank closed at its upper end and communicating at its lower end with the lower portion of said tank a boiling tube extending from the top of said boiling chamber through said hollow column and said extension tube and opening through the upper end of said extension tube and a primary siphon tube extending from the lower portion of the boiling chamber through said hollow column to a point within said auxiliary tube and below the upper end thereof.

2. In a coffee urn, the combination of a main open-topped vessel, an infusion tank in the upper portion of said vessel having a sump formed at its bottom, a disk resting normally on the floor of said vessel and adapted to form with said floor a boiling chamber, a hollow supporting column connecting said disk with said tank, an auxiliary tube extending from the top of said hollow column to the upper portion of said tank, closed at its upper end and having its lower end connected with said sump, a boiling tube extending from the top of said boiling chamber through said hollow column and said auxiliary tube and opening through the upper end of said auxiliary tube and a primary siphon tube extending from the lower portion of the boiling chamber through said hollow column to a point within said auxiliary tube and below the upper end thereof.

3. In a coffee urn the combination of a main open topped vessel, an infusion tank at the upper portion of the said vessel, a disk resting normally on the floor of said main vessel and adapted to form with said floor a boiling chamber, a hollow supporting column connecting said disk with said tank, a diaphragm at each end of said hollow column, a sleeve extending through said hollow column a boiling tube extending from the top of the boiling chamber, through said sleeve to the upper portion of said infusion tank, an auxiliary tube extending from the top of said hollow column to the upper portion of said tank surrounding said boiling tube and connecting at its lower end with the lower portion of said tank, a primary siphon tube extending from the lower portion of said boiling chamber through said hollow column and terminating in said auxiliary tube below its upper end.

4. In a coffee urn, the combination of a main open-topped vessel, an infusion tank at the upper portion of the said vessel, a disk resting normally on the floor of said main vessel and adapted to form with said floor a boiling chamber, a hollow supporting column connecting said disk and said infusion tank, a sleeve extending through said hollow column, a boiling tube extending from the top of the boiling chamber, through said sleeve to the upper portion of said infusion tank, an auxiliary tube extending from the top of said hollow column to the upper portion of said tank surrounding and permanently secured to said boiling tube and connecting at its lower end with the lower portion of said tank, a primary siphon tube extending from the lower portion of said boiling chamber through said hollow column and terminating in said auxiliary tube below its upper end.

5. In a coffee urn, the combination of a main open topped vessel, an infusion tank at the upper portion of the said vessel, a disk resting normally on the floor of said main vessel and adapted to form with said floor a boiling chamber, a hollow supporting column connecting disk with said tank, a diaphragm at each end of said hollow column, a sleeve extending through said hollow column, a boiling tube extending from the top of the boiling chamber, through said sleeve to the upper portion of said infusion tank, an auxiliary tube extending from the top of said hollow column to the upper portion of said tank surrounding said boiling tube and connecting at its lower end with the lower portion of said tank, a primary siphon tube extending from the lower portion of said boiling chamber, through said hollow column and permanently secured thereto and terminating in said auxiliary tube below its upper end.

6. A coffee urn of the class described having an infusion tank, a central boiling tube, a primary siphon tube adjacent thereto and an auxiliary siphon tube for covering and inclosing the upper lateral portion of the boiling tube and completely inclosing the upper end of the primary siphon tube to form the short leg of the siphon, said auxiliary tube communicating at its lower end with the infusion tank.

In testimony whereof I hereby affix my signature.

ELMER N. BACHELDER.

Copies of this patent may be obtained for five cents each, by addressing the "Commissioner of Patents, Washington, D. C."